United States Patent [19]

Freeman

[11] Patent Number: 5,104,075
[45] Date of Patent: Apr. 14, 1992

[54] MACHINE LEVELING DEVICE

[76] Inventor: Lewis G. Freeman, 1509 Pontian Dr., Kokomo, Ind. 46901

[21] Appl. No.: 682,450

[22] Filed: Apr. 8, 1991

[51] Int. Cl.$^5$ .................................. F16M 11/24
[52] U.S. Cl. ............................ 248/188.4; 248/677; 411/393; 411/536
[58] Field of Search ............ 248/677, 680, 650, 656, 248/188.4, 188.8; 411/535, 536, 537, 538, 393

[56] References Cited

U.S. PATENT DOCUMENTS

| | | | |
|---|---|---|---|
| 1,934,746 | 11/1933 | Stoddard | 248/188.4 |
| 2,010,299 | 8/1935 | Gray | 248/188.4 |
| 3,351,309 | 11/1967 | Harrison | 248/635 |
| 3,575,288 | 4/1971 | Brucken | 248/188.4 X |
| 3,669,393 | 6/1972 | Paine | 248/188.4 |
| 4,108,407 | 8/1978 | Cable et al. | 248/188.4 X |
| 4,809,421 | 3/1989 | Justice | 29/525.1 |

*Primary Examiner*—Ramon O. Ramirez
*Attorney, Agent, or Firm*—Woodard, Emhardt, Naughton, Moriarty & McNett

[57] ABSTRACT

A machine leveling assembly is provided which employs a screw-jerk mechanism for adjustably raising and lowering a machine in conjunction with a ball and socket type foot and a shim.

5 Claims, 1 Drawing Sheet

MACHINE LEVELING DEVICE

BACKGROUND OF THE INVENTION

This invention relates to machine leveling devices.

Many types of machinery and other devices require precision alignment or leveling for optimum performance. Examples of such devices include motors, pumps, turbines, presses, and scientific instruments and the like. At present many of these devices are leveled by using a simple screw-jack consisting of a bolt that provides a means of raising or lowering the device, threaded directly into the device or into a mount. U.S. Pat. No. 3,351,309 to Harrison discloses such a simple screw-jack type of adjustable mounting.

The use of a bolt as a load bearing "leg" for the support of machinery can pose difficulties if the machine is to be placed on a surface that varies in elevation between different mounting locations. Because the end of the bolt (or the bolt head if the bolt is used in an inverted position) is relatively flat and is fixed in a position perpendicular to the machine, any tilt in the bearing surface or floor will result in the machine load being transferred to the floor through only a portion of the end or head of the bolt. This causes a high concentration of stress in a small area of the bolt and the ultimate load bearing surface (i.e. the floor) that can result in bolt failure or shear failure of the loading surface.

A further drawback of using a simple bolt as a load bearing leveling means is frictional build-up between the bolt end or head and the bearing surface. As bolts at different locations are adjusted, the machine or other device tends to rotate about the leveling bolt that is being adjusted. This rotation is resisted by the remaining leveling bolts due to the "biting" action of the bolts into the bearing surface. As a result of this resistance, stress accumulates at the interface between the bolts and the bearing surfaces until the frictional force is overcome at which time the device "snaps" free and rotates or translates. Because the resulting motion is unpredictable, the number of adjustments required to level the device during the leveling process increases.

An alternate means of leveling machines and the like is through the use of plates or shims of various thicknesses placed under the supports of the devices. U.S. Pat. No. 4,809,421 to Justice discloses a shim for insertion between the base of a machine and a support bearing plate to adjust the spacing therebetween. Shims provide the advantage of transferring loads across a greater area than through bolt threads as screw-jacks do.

Shims do, however, have drawbacks of their own. The use of shims requires an external means of raising and lowering the device during installation and adjustment of the shims. Often times the use of shims is a trial and error process that requires shims of multiple thicknesses and a repeated number of raising and lowering cycles.

Shims are also difficult to use if the machine is to be placed on a surface that varies in elevation between different mounting locations. Because the device being leveled may be installed on a sloping surface, the bottom of the device may be tilted with respect to the lower shim surface facing the floor. If the shim has an upper surface parallel to its lower surface, the angle between the bottom of the device and the floor may cause the load to be transferred through only a small portion of the shim's bearing surface. A remedy for this problem is the fabrication of shims of variable cross-sections. This remedy is, however, impractical and cost prohibitive. The use of multiple shims and extremely thin shims is another alternative. Using such shims can, however, cause other difficulties as documented in the Justice '421 patent.

SUMMARY OF THE INVENTION

An improved machine leveling assembly according to one embodiment of the present invention comprises a ground engaging member having a concave upwardly facing surface, a mounting member having a means for attaching said mounting member to a device that requires leveling and a body with a threaded bore therethrough, an elongated cylindrical load transmission member having a means of attaching a tool for rotation of said load transmission member and having at its lower end a convex spherical surface for complementary engagement with said upwardly facing surface and a threaded portion for threaded engagement with the threaded bore.

The present invention provides a better remedy for leveling on sloping surfaces by using a ball and socket arrangement. This arrangement allows for rotation of the leveling assembly while assemblies at other locations are being adjusted. The ball and socket combination also allows for the load to be distributed more evenly about the entire spherical surface of the socket. By using a shim, the present invention also allows for the load to be transferred to the floor through the shim rather than through the bolt threads.

It is an object of the present invention to provide a new and improved machine leveling assembly.

Another object of the present invention is to provide a machine leveling assembly that compensates for rotation of the device to be leveled during the leveling process.

Related objects and advantages of the present invention will be apparent from the following description.

DESCRIPTION OF THE PREFERRED EMBODIMENT

Figure 1:
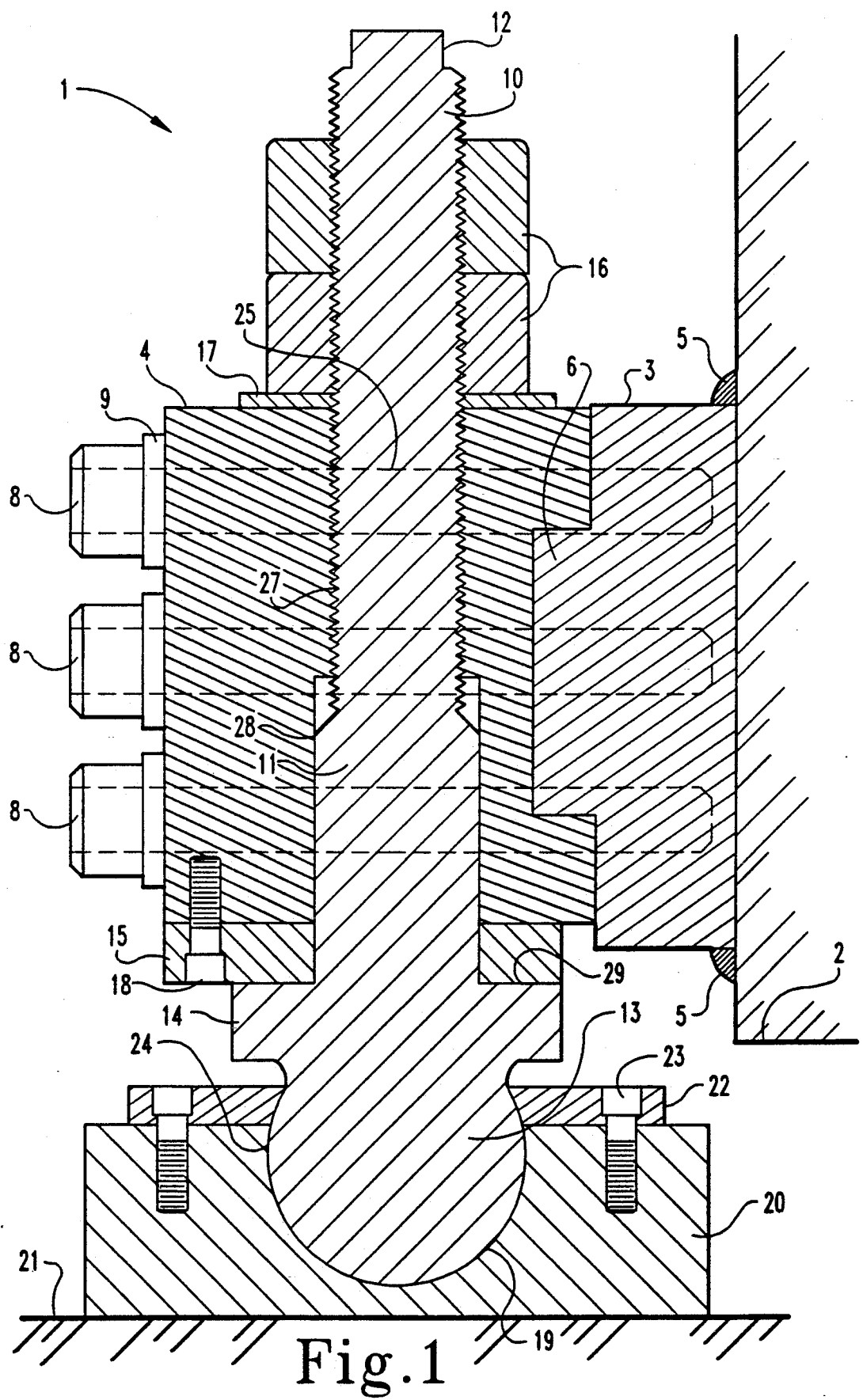
FIG. 1 is a cross-sectional view of the preferred embodiment of the machine leveling assembly incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a machine leveling assembly 1. The machine leveling assembly 1 is attached to a machine or other device 2 requiring leveling by way of a two part mounting assembly consisting of a mounting member base 3 and a mounting member body 4.

Mounting member base 3 is shown fixed to the machine 2 requiring leveling by a weld 5. The mounting member base 3 may also be bolted to the machine 2 if the device has provisions for such attachment. The mounting member base 3 has a raised key 6 on the side of the mounting member base 3 opposite the machine 2. The raised key 6 fits snugly into a recess 7 in the mounting member body 4. The key 6 provides an easy and efficient means of aligning the mounting member base 3 with the mounting member body 4 and also provides a means of transferring the weight of the machine 2 to the machine leveling assembly 1.

The mounting member body 4 has a number of horizontal bores 25 passing therethrough to accommodate mounting bolts 8. Each mounting bolt 8 passes through a mounting bolt washer 9 installed between the heads of the bolts and the mounting member body 4. The mounting member base 3 has horizontal threaded bores 26 corresponding to the horizontal bores 25 in the mounting member body 4 that threadingly engage mounting bolts 8. It will be appreciated that the mounting member body 4 may be bolted directly to the machine 2 if the machine has provisions for such attachment.

The mounting member body 4 also has a two part cylindrical vertical bore therethrough sized to accommodate a load transmission member 10. The upper portion of the bore 27 is threaded and threadingly engages the load transmission member 10 to allow for vertical adjustment of the machine leveling assembly 1. The lower portion of the bore 28 is slightly enlarged and without threads to allow for a smooth fit with the pilot shaft portion 11 of the load transmission member 10.

Load transmission member 10 has at its uppermost end a tool attaching means 12. In the preferred embodiment the tool attaching means consists of a square fitting suitable for engagement with a wrench or other such tool. Two hold down nuts 16 seated against a hold down nut washer 17 threadingly engage the upper threaded cylindrical portion of the load transmission member 10 thereby locking load transmission member to mounting member body 4. The nuts 16 provide a means of preventing the load transmission member 10 from rotating once the leveling is complete.

The load transmission member 10 terminates at its lowermost end in a ball 13. Disposed between the ball 13 and the pilot shaft 11 of the load transmission member 10 is an enlarged cylindrical shim seat 14. The shim seat 14 has a flat, horizontal, upper face 29 that provides a bearing surface for a shim 15. The shim 15 is secured to the mounting member body 4 by a shim securing bolt 18 that is flush mounted in a countersunk bore in the shim 15.

The ball 13 of load transmission member 10 fits snugly in a socket 19 in the ground engaging member 20 with the socket 19 having a concave surface complementary to the ball 13. Ground engaging member 20 can be anchored to the load bearing surface 21 by welding or other means or can be left free to be repositioned on the load bearing surface 21.

The ball 13 of load transmission member 10 is secured to the ground engaging member 20 by a two-piece hold down plate 22. The hold down plate 22 has a partially concave surface 24 that engages the ball 13 in a manner that allows the ball 13 to rotate freely about the ground engaging member 20. Each piece of hold down plate 22 is u-shaped in plan view with the first side being a mirror image of the other. Prior to attaching the machine leveling assembly 1 to the machine 2, the hold down plate 22 is assembled by placing each side about the ball 13 with the "U" facing toward the ball 13. The hold down plate 22 pieces are fixed to the ground engaging member 20 by hold down plate securing bolts 23 that are flush mounted in a countersunk hole in the hold down plate 22.

After a number of machine leveling assemblies 1 without shims 15 have been installed on the machine 2 to be leveled, the hold down nuts 16 are loosened freeing the load transmission member 10 for rotation. A wrench or other appropriate tool is then placed on the tool attaching surface 12 and turned causing the load transmission element 10 to rotate and threadingly advance up or down.

Once the machine 2 is level, the distance between the bottom of the mounting member body 4 and the shim surface 29 is measured and a shim 15 is precision ground to fit between the bottom of the mounting member body 4 and the shim surface 29. The hold down nuts 16 are again loosened, a tool is placed on the tool attaching surface 12 and turned raising the machine 2 enough to allow the shim 15 to be placed on the shim surface 29. The shim 15 is then secured to the bottom of the mounting member body 4 by the shim securing bolt 18.

After the shim 15 is secured, the tool is re-attached to the tool attaching surface 12 and turned, lowering the mounting member body 4 until the bottom of the shim 15 makes contact with the shim surface 29 of the shim seat 14. The leveling process is then completed by tightening the hold down nuts 16.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A machine leveling assembly comprising:
   a ground engaging element having a concave upwardly facing surface;
   a mounting element for a machine that requires leveling;
      said mounting element having a body with a bore therethrough which bore has a female threaded portion and an enlarged lower portion;
   an elongated cylindrical load transmission member extending through said bore, and having;
      an enlarged pilot portion having a diameter slightly less than the diameter of said lower portion of said bore wherein said pilot portion fits snugly inside said lower portion of said bore;
      means for attaching a tool for rotation of said load transmission member;
      at its lower end a convex spherical surface for complementary engagement with said upwardly facing surface; and
      a threaded portion for threaded engagement with said female threaded portion.

2. The machine leveling assembly of claim 1 wherein said ground engaging element is pivotably attached to said load transmission member.

3. A machine leveling assembly comprising:
   a ground engaging element having a concave upwardly facing surface;
   a mounting element for a machine that requires leveling;
      said mounting element having a body with a bore therethrough which bore has a female threaded portion;

an elongated cylindrical load transmission member extending through said bore and having;
  means for attaching a tool for rotation of said load transmission member;
  at its lower end a convex spherical surface for complementary engagement with said upwardly facing surface; and
  a threaded portion for threaded engagement with said female threaded portion.
said ground engaging element including means for securing said load transmission emember to said ground engaging element;
said means for securing said ground engaging element to said load transmission member including;
  a plate secured to said ground engaging member;
    said plate having an opening with a concave semi-spherical inner surface complementary to said convex spherical surface of said load transmission member.

4. A machine leveling assembly comprising:
a ground engaging element having a concave upwardly facing surface;
a mounting element for a machine that requires leveling;
  said mounting element having a body with a bore therethrough which bore has a female threaded portion; and
an elongated cylindrical load transmission member extending through said bore and having;
  means for attaching a tool for rotation of said load transmission member;
  at its lower end a convex spherical surface for complementary engagement with said upwardly facing surface; and
  a threaded portion for threaded engagement with said female threaded portion;
said mounting element having a horizontal bottom surface;
said load transmission member having an enlarged seat portion providing a horizontal flat surface facing upwardly; and
a shim removably disposed between said horizontal bottom surface of said mounting element and said horizontal flat surface of said cylindrical load transmission member.

5. The machine leveling assembly of claim 4 wherein;
said shim has a means of attaching said shim to said mounting member.

* * * * *

UNITED STATES PATENT AND TRADEMARK OFFICE
CERTIFICATE OF CORRECTION

PATENT NO. : 5,104,075
DATED : April 14, 1992
INVENTOR(S) : Lewis Gene Freeman

It is certified that error appears in the above-identified patent and that said Letters Patent is hereby corrected as shown below:

On the Title page, item [76], "Pontian" should be --Pontiac--.

Signed and Sealed this

Fifteenth Day of June, 1993

Attest:

MICHAEL K. KIRK

Attesting Officer

Acting Commissioner of Patents and Trademarks